(12) United States Patent
Kuo

(10) Patent No.: US 9,567,027 B2
(45) Date of Patent: Feb. 14, 2017

(54) BICYCLE SEAT POST HEIGHT ADJUSTMENT MECHANISM

(71) Applicant: Taiwan Hodaka Industrial Co., Ltd., Taipei (TW)

(72) Inventor: Frank Kuo, Taipei (TW)

(73) Assignee: Taiwan Hodaka Industrial Co., Ltd., Taipei (TW)

( * ) Notice: Subject to any disclaimer, the term of this patent is extended or adjusted under 35 U.S.C. 154(b) by 364 days.

(21) Appl. No.: 14/255,995

(22) Filed: Apr. 18, 2014

(65) Prior Publication Data
US 2015/0300382 A1    Oct. 22, 2015

(51) Int. Cl.
*F15B 15/14* (2006.01)
*B62J 1/10* (2006.01)
*B62J 1/06* (2006.01)
*B62J 1/08* (2006.01)

(52) U.S. Cl.
CPC .. *B62J 1/10* (2013.01); *B62J 1/06* (2013.01); *B62J 1/08* (2013.01); *B62J 2001/085* (2013.01)

(58) Field of Classification Search
CPC ... F15B 15/1409; F15B 15/149; F15B 15/202; B62J 1/06; B62J 1/08; B62J 2001/085; A47C 3/30
USPC .. 91/43, 437; 188/195, 315, 322.13; 267/33, 34, 132
See application file for complete search history.

(56) References Cited

U.S. PATENT DOCUMENTS

| | | | | |
|---|---|---|---|---|
| 3,116,089 A * | 12/1963 | Banzhaf | | B62J 1/06 267/132 |
| 5,028,037 A * | 7/1991 | Wang | | A47C 3/30 267/64.13 |
| 5,294,086 A * | 3/1994 | Fantini | | A47C 3/30 248/631 |
| 7,845,602 B1 * | 12/2010 | Young | | F16B 7/1409 248/125.8 |
| 8,511,655 B2 * | 8/2013 | Wu | | B62J 1/08 248/161 |
| 2002/0174766 A1 * | 11/2002 | Norton | | B66F 9/22 92/82 |
| 2009/0324327 A1 * | 12/2009 | McAndrews | | B62J 1/08 403/409.1 |

* cited by examiner

*Primary Examiner* — Eric Keasel
*Assistant Examiner* — Matthew Wiblin
(74) *Attorney, Agent, or Firm* — Alan D. Kamrath; Kamrath IP Lawfirm, P.A.

(57) ABSTRACT

A bicycle seat post height adjustment mechanism, in a state of locking, has a lower valve packing ring blocking a lower valve port. Moreover, based on demands, an upper valve packing ring is allowed selectively to block an upper valve port or to be away from the upper valve port to stay on top of the upper valve port. Thus, a pin is driven to axially move down to enable a seat post to make fine adjustment, stepless adjustment or stepped adjustment in height. Moreover, the seat post may self-return to the assigned position (an upper position, a middle position or a lower position) to prevent the height of the seat from altering.

9 Claims, 9 Drawing Sheets

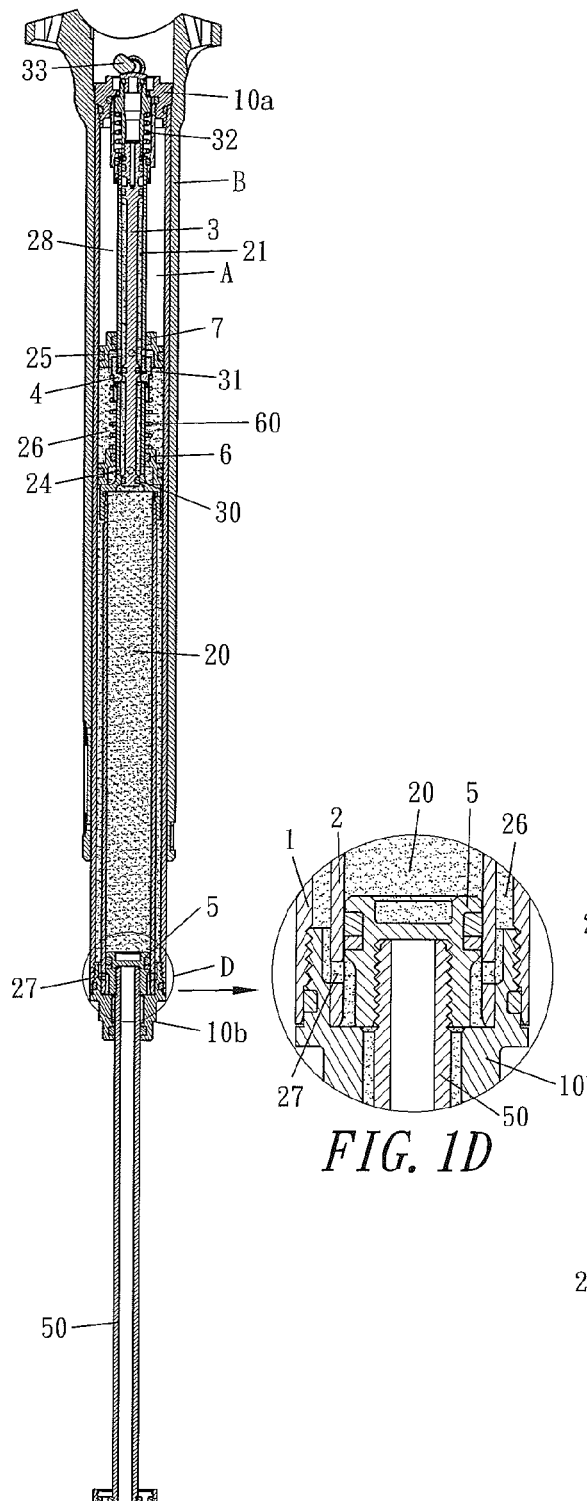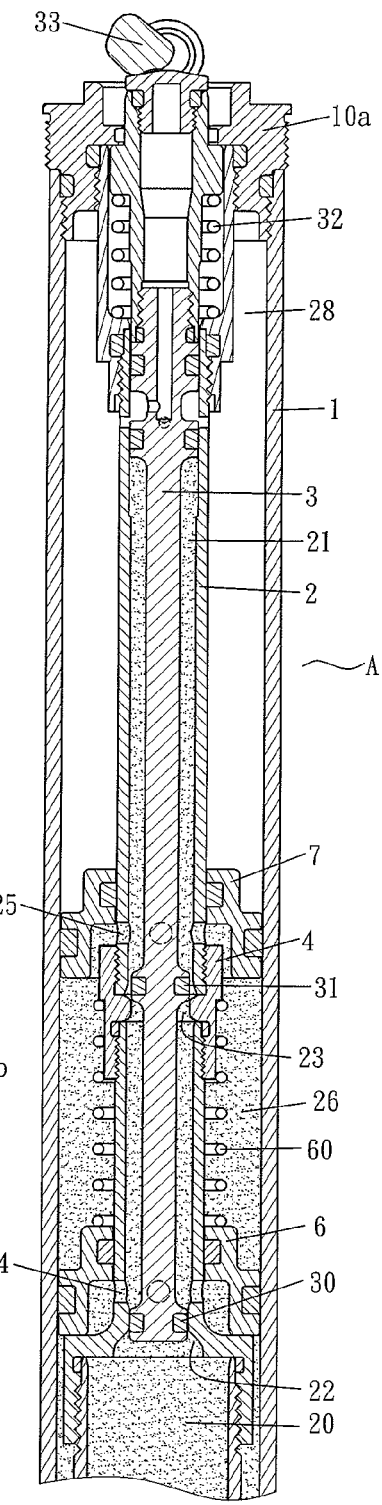
FIG. 1
FIG. 1D
FIG. 2

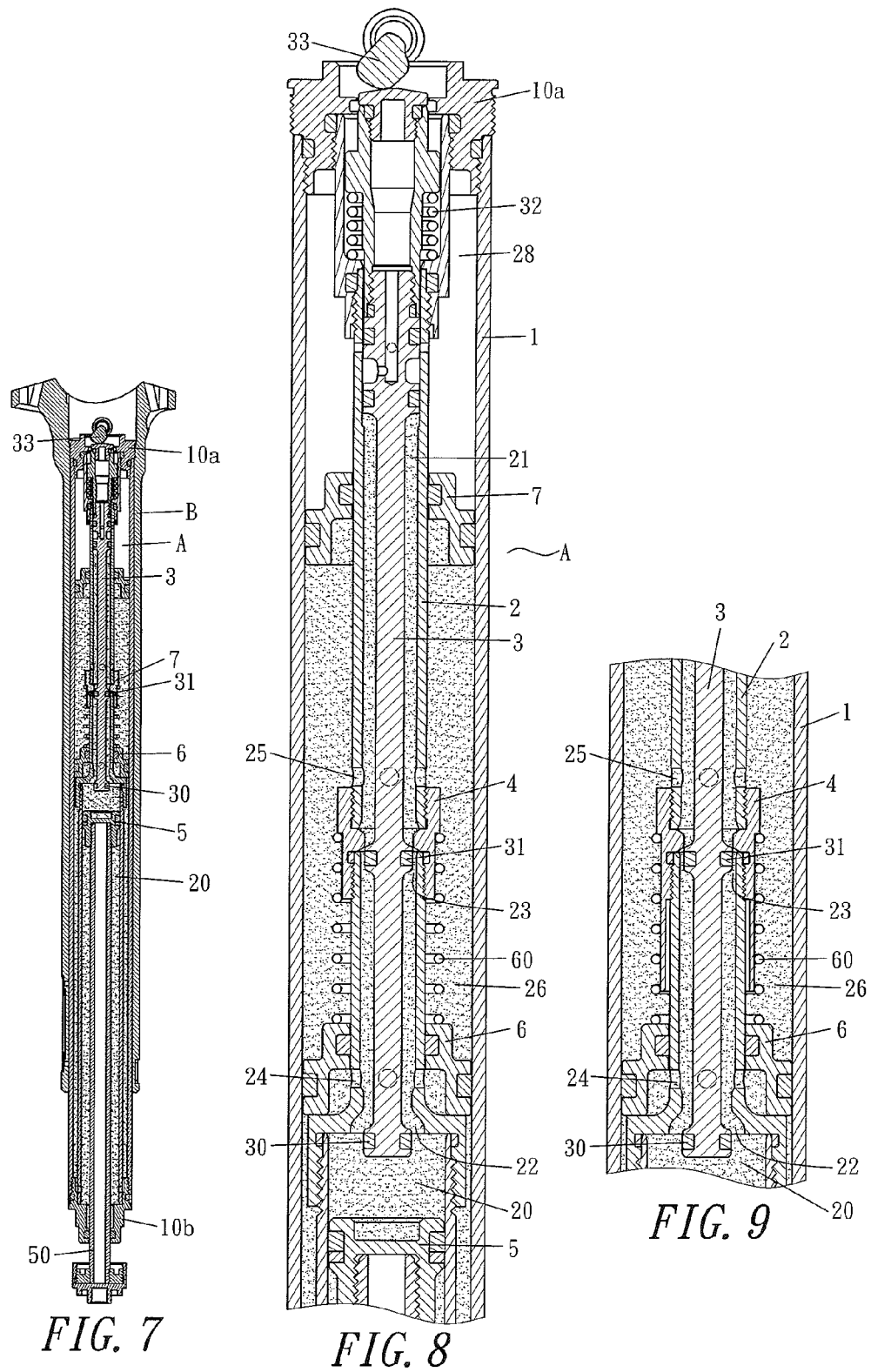

BICYCLE SEAT POST HEIGHT ADJUSTMENT MECHANISM

BACKGROUND OF THE INVENTION

Field of the Invention

The present invention relates to a bicycle seat post height adjustment mechanism and, more particularly, to a bicycle seat post height adjustment mechanism that not only enables said seat post to make fine adjustment, stepless adjustment or stepped adjustment in height, but also allows said seat post to self-return to the assigned position after a user releases the bicycle without holding the seat or the seat post thereof.

Description of the Prior Art

Generally, the height of a bicycle seat post is adjustable so that the user may adjust the seat post to the proper height for comfortable riding according to his/her figure or demands. Substantially, a prior art oil hydraulic bicycle seat post height adjustment device allows stepless adjustments in height so that the seat post is usually adjusted to a too high position or a too low position. Moreover, the user can not adjust the seat post height to the proper height in a mode of fine adjustment or in a mode of stepped adjustment. Therefore, user has to gradually adjust the seat post to modify the height thereof. Further, as the user lifts a bicycle by holding its seat (seat post), the lifting force may impact the prior art oil hydraulic device inside the seat post and thereby cause the seat post displacement in height. Obviously, the prior art bicycle seat post height adjustment device needs to be meliorated.

SUMMARY OF THE INVENTION

It is against the background and the drawbacks associated therewith that the present invention has been developed.

The objective of the present invention is to provide a bicycle seat post height adjustment mechanism that not only enables said seat post to make fine adjustment, stepless adjustment or stepped adjustment in height to adapt to individual demands, but also allows said seat post to self-return to the assigned position after a user releases the bicycle without holding the seat or the seat post thereof.

The present invention includes an inner tube of which the interior is partitioned into a lower oil chamber and an upper oil chamber by a lower valve port. A piston is arranged inside said lower oil chamber, and a piston rod thereof may extend through said lower oil chamber. The interior of said upper oil chamber is provided with an upper valve port. An outer tube is arranged outside of said inner tube, and a lateral oil chamber is arranged between said inner tube and said outer tube. An upper through-hole disposed on top of said upper valve port and a middle through-hole configured on top of said lower valve port allow said upper oil chamber and said lateral oil chamber to be communicated with each other. An upper floating piston and a lower floating piston arranged from top to bottom are respectively inserted into said lateral oil chamber outside of said inner tube. A spring fixture element is fixed to the outer wall of said inner tube and configured between said upper floating piston and said lower floating piston. A spring is arranged between said spring fixture element and said lower floating piston to push said lower floating piston to move downwards to the support end of the lower position. Thus, the interior of the bottom end of said lower floating piston may communicate with said middle through-hole. The space on top of said upper floating piston within said lateral oil chamber is an air chamber. When said upper floating piston reaches the lowest position, the interior of the bottom end of said upper floating piston may communicate with said upper through-hole. A lower through-hole is configured on the outer wall of the bottom end of said lower oil chamber and also under said piston to allow said lower oil chamber to communicate with said lateral oil chamber. A pin is inserted into said inner tube. The outer wall of said pin corresponding to said lower valve port is disposed with a lower valve packing ring, and the outer wall of said pin corresponding to said upper valve port is disposed with a upper valve packing ring. Said pin is supported by a first spring to allow said bicycle seat post height adjustment mechanism to be in a state of locking. When said bicycle seat post height adjustment mechanism is in a state of locking, said lower valve packing ring may block said lower valve port. Moreover, based on demands, said upper valve packing ring is allowed selectively to block said upper valve port or to be away from said upper valve port to stay on top of said upper valve port. Thus, said pin is driven to axially move down to enable said seat post to make fine adjustment, stepless adjustment or stepped adjustment in height. Moreover, said seat post may self-return to the assigned position (upper position, middle position or lower position) to prevent the height of the seat from altering.

BRIEF DESCRIPTION OF THE DRAWINGS

In order that the present invention may be more fully understood, a preferred embodiment thereof will now be described with reference to the accompanying drawings, in which:

FIG. 1 is a sectional view of the bicycle seat post height adjustment mechanism in a fully assembled state according to the preferred embodiment of the present invention.

FIG. 1D is an enlarged view of portion D shown in FIG. 1.

FIG. 2 is a partial enlarged view of FIG. 1.

FIG. 7 is a sectional view showing when the seat post makes stepless height adjustment, the pin is in a state of being pushed down according to the preferred embodiment of the present invention.

FIG. 8 is a partial enlarged view of FIG. 7.

FIG. 9 is a sectional view showing the state that the length of the spring fixture element has been altered according to the preferred embodiment of the present invention.

DESCRIPTION OF THE PREFERRED EMBODIMENTS

Figures 3, 4:
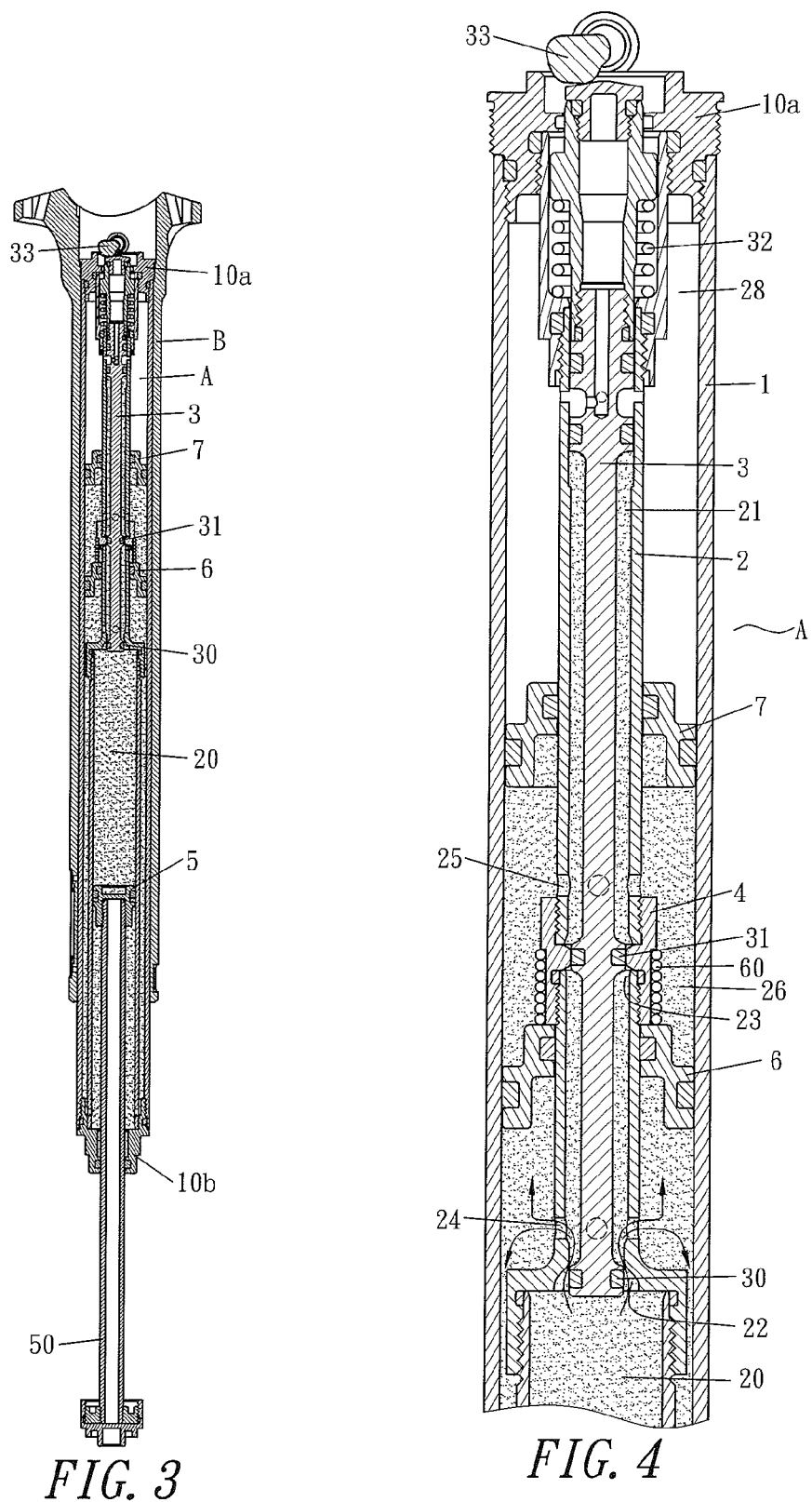
FIG. 3 is a sectional view showing when the seat post makes fine height adjustment, the pin shown in FIG. 1 is in a state of being pushed down according to the preferred embodiment of the present invention.
FIG. 4 is a partial enlarged view of FIG. 3.

The means for achieving the aforesaid objective and the functions of the present invention will become apparent from the following description, taken in connection with the accompanying drawings, and preferred embodiments of the present invention are disclosed.

Referring to FIG. 1 and FIG. 2, an embodiment of the present invention provides a bicycle seat post height adjustment mechanism allowing the height of a seat post B to be adjusted finely or steplessly. The bicycle seat post height adjustment mechanism A disclosed in the embodiment of the present invention is inserted into said seat post B, and the outer wall thereof is fixed to the inner wall of said seat post B. The bicycle seat post height adjustment mechanism A comprises as follows (as shown in FIG. 2).

An outer tube 1 has an upper opening and a lower opening respectively provided with a plug 10a, 10b having an outer wall of which the thread segment is fastened to the inner wall of said seat post B.

An inner tube 2 is fixed to the interior of said outer tube 1 and the bottom section of the interior thereof is partitioned into a lower oil chamber 20 and an upper oil chamber 21 on top of said lower oil chamber 20. Said lower oil chamber 20 and said upper oil chamber 21 communicate with each other via a lower valve port 22. Moreover, an upper valve port 23 is arranged in the middle of the interior of said upper oil chamber 21.

A pin 3 is inserted into said upper oil chamber 21 of said inner tube 2, and the outer wall of the bottom end thereof is provided with a lower valve packing ring 30 corresponding to said lower valve port 22. Further, the outer wall in the middle thereof is arranged with an upper valve packing ring 31 corresponding to said upper valve port 23. The outer side of the top end of said pin 3 is connected with a first spring 32 which may push said pin upwards in a normal state to allow said lower valve packing ring 30 to block said lower valve port 22 and simultaneously to cause said upper valve packing ring 31 to be away from said upper valve port 23 to stay on top of said upper valve port 23, as shown in FIG. 2.

Moreover, the top end of said pin 3 is disposed with a cam 33 which is controlled to turn angle by a user to drive said pin 3 to axially move.

A spring fixture element 4 is fixed to the outer wall of said inner tube 2 and configured on top of said lower valve port 22.

A piston 5 is arranged within said lower oil chamber 20 and provided with a piston rod 50 extending downwards through said lower oil chamber 20 via said plug 10b, as shown in FIG. 1.

A lower floating piston 6 is inserted into the outer side of said inner tube 2, and is disposed under said spring fixture element 4 as well as between said inner tube 2 and said outer tube 1. Moreover, said lower floating piston 6 is provided with a top end and a bottom end which is supported. Further, an axial length is arranged between said top end of said lower floating piston 6 and said spring fixture element 4. The bottom end of said lower floating piston 6 touches tightly the top end of said lower oil chamber 20 to stop said lower floating piston 6 to move downwards. The top end of said lower floating piston 6 is connected with said spring fixture element 4 by a second spring 60 which allows said lower floating piston 6 to be pushed downward to enable the bottom end of said lower floating piston 6 to tightly touch the top end of said lower oil chamber 20. Moreover, the space under the bottom end of said lower floating piston 6 may communicate with said upper oil chamber 21 through a middle through-hole 24 arranged on top of said lower valve port 22 of said inner tube 2.

An upper floating piston 7 is inserted into the outer side of said inner tube 2 and is disposed on top of said spring fixture element 4 as well as between said inner tube 2 and said outer tube 1. Moreover, the bottom end of upper floating piston 7 may communicate with said upper oil chamber 21 through an upper through-hole 25 arranged on top of said upper valve port 23 of said inner tube 2. Further, a lateral oil chamber 26 is arranged between said inner tube 2 and said outer tube 1, and said lateral oil chamber 26 is positioned under said upper floating piston 7. In addition, a lower through-hole 27 is arranged under said piston 5 and between said lateral oil chamber 26 and said lower oil chamber 20 to allow said lateral oil chamber 26 and said lower oil chamber 20 to communicate with each other via said lower through-hole 27, as shown in FIG. 1D. In addition, an air chamber 28 is arranged between said inner tube 2 and said outer tube 1, and said air chamber 28 is positioned on top of said upper floating piston 7.

FIG. 1 and FIG. 2 show that all of the aforementioned members are fully assembled together. Said bicycle seat post height adjustment mechanism A allows a user to choose between finely tuning or steplessly adjusting the height of seat post B.

I. Mode of Finely Adjusting the Height of Seat Post B:

In such mode, said cam 33 is controlled to turn to push down the top end of said pin 3 to allow said pin 3 to axially move down in a short-range mode. Oil flows upwards to push said lower floating piston 6 to compress said second spring 60 to axially move upwards until the top end of said lower floating piston 6 may touch the bottom end of said spring fixture element 4, and further, oil returns to the space under said piston 5 within said lower oil chamber 20 through said lower through-hole 27. At the same time, said upper floating piston 7 may simultaneously be pushed upwards to move up, so that said seat post B may be adjusted to move down, as shown in FIG. 3.

Figures 5, 6:
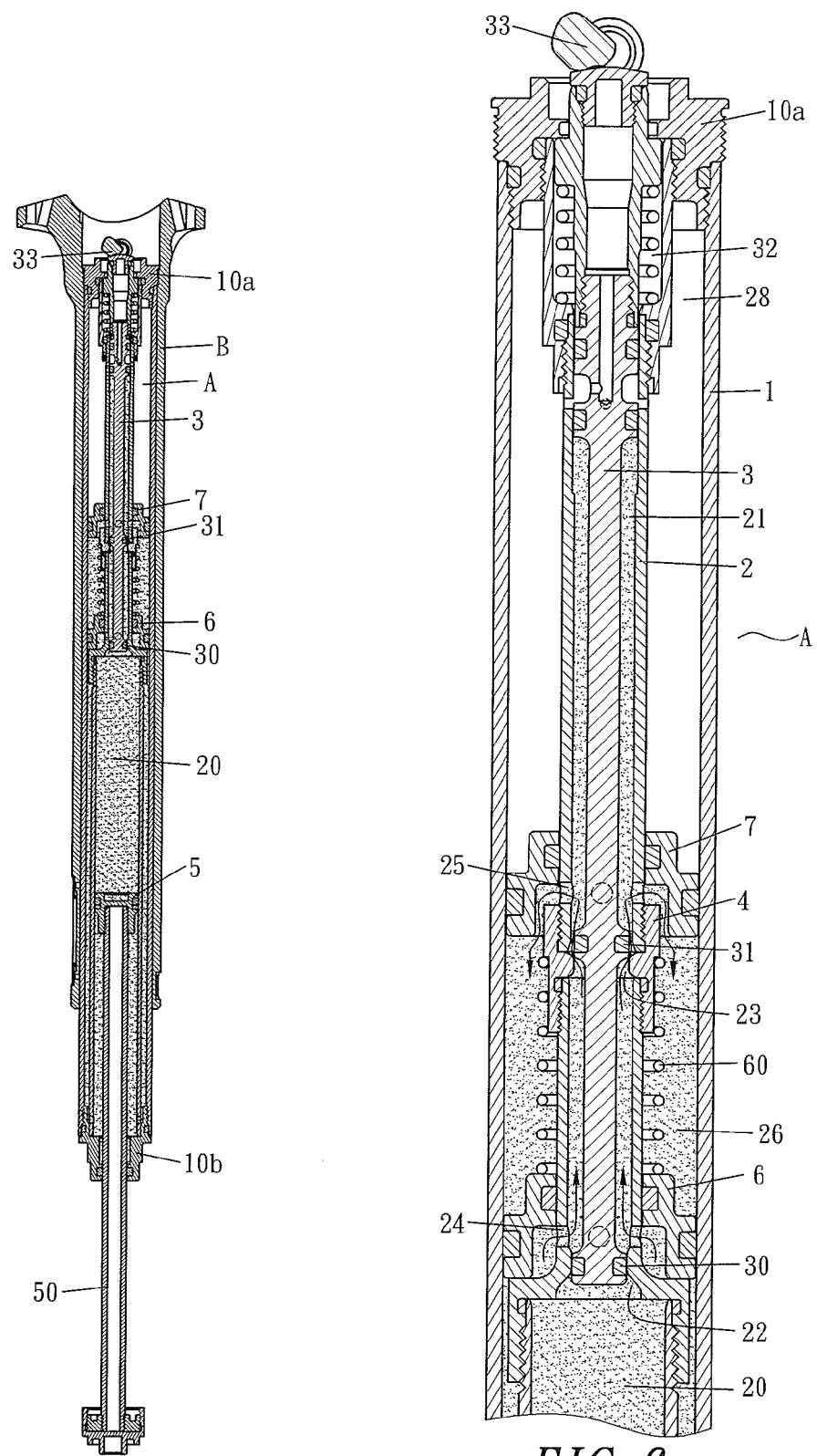
FIG. 5 is a structure diagram showing that the pin shown in FIG. 3 is no longer pushed to return to the home position after the seat post height is finely adjusted downwards according to the preferred embodiment of the present invention.
FIG. 6 is a partial enlarged view of FIG. 5.

When released, said cam 33 may return to home position. That is, said pin 3 is no longer in a state of being pushed, as shown in FIG. 5 and FIG. 6. Said first spring 32 may push said pin 3 back by restoring force thereof to enable said pin 3 to return to the normal home position so that said lower valve packing ring 30 is allowed to block said lower valve port 22 to revert to the blocking state and simultaneously to cause said upper valve packing ring 31 to be away from said upper valve port 23 to stay on top of said upper valve port 23. Moreover, said second spring 60 may downward push said lower floating piston 6 back to home position by a restoring force thereof. The oil under said lower floating piston 6 may flow into the space between said lower floating piston 6 and said upper floating piston 7 via said middle through-hole 24, said upper oil chamber 21, said upper valve port 23 and said upper through-hole 25. Thus, said seat post B is not allowed to be pushed down for height adjustment so that said seat post B is in a state of locking.

Further, if said seat post B needs to be finely adjusted down, a user may control said cam 33 to turn for pushing down said pin 3 to enable said pin 3 to move downwards. Consequently, said lower valve packing ring 30 is allowed to be away from said lower valve port 22, and said upper valve packing ring 31 may block said upper valve port 23. Thus, said seat post B is allowed to be pushed down for height adjustment by repeating the aforesaid procedure.

As an example, the range of each axial down-movement of said pin 3 set up in the present invention is 2 mm, as shown in FIG. 3 and FIG. 4. When said pin 3 moves down, said lower valve packing ring 30 moving simultaneously with said pin 3 is allowed to be away from said lower valve port 22, and said upper valve packing ring 31 may block said upper valve port 23. Moreover, by pushing down said seat post B to adjust the height thereof, the oil within said lower oil chamber 20 is squeezed into said upper oil chamber 21 through said lower valve port 22, and said upper valve port 23 is blocked by said upper valve packing ring 31. Thus, the oil running into said upper oil chamber 21 may flow into the space under said lower floating piston 6 within said lateral oil chamber 26 through said middle through-hole 24, and then, the oil separates into two: one moves.

II. Mode of Steplessly Adjusting the Height of Seat Post B:

In such mode, said cam 33 is controlled to turn to push said pin 3 to allow said pin 3 to axially move down in longer-range mode (For example, the range of each axial down-movement of said pin 3 set up in the present invention is 4 mm), as shown in FIG. 7 and FIG. 8. When said pin 3 moves down, said lower valve packing ring 30 moving simultaneously with said pin 3 is allowed to be away from said lower valve port 22, and said upper valve packing ring 31 may move down and pass through said upper valve port 23. Said upper valve port 23 is open so that said upper oil chamber 21, said lower oil chamber 20 and said lateral oil chamber 26 are intercommunicated with one another. Thus, the oil volume conversion may occur among said three chambers. Accordingly, by pushing down said seat post B, said seat post B is allowed to be steplessly adjusted in height. When a demanded height is achieved, said cam 33 needs to be released to free said pin 3 to fix the height of said seat post B.

III. Seat Post B Incorporating Function of Self-Returning to the Assigned Position The space on top of said piston 5 within said lower oil chamber 20 may become larger when a user lifts a bicycle by holding its seat (seat post). However, the oil volume within said space is still constant so that the extra space may result in a vacuum. Due to the force from the up-movement of said seat post B, the oil under said piston 5 within said lower oil chamber 20 may reversely flow through said lower through-hole 27 into the space under said lower floating piston 6 within said lateral oil chamber 26 to upwards push said lower floating piston 6 and said upper floating piston 7 to move up simultaneously. Moreover, the pressure force within said air chamber 28 may increase as said upper floating piston 7 moves up. Further, the pressure force accumulated within said air chamber 28 and the vacuum suction force generated on top of said piston 5 inside said lower oil chamber 20 simultaneously work to push said seat (said seat post B) back to the home position thereof when the seat (said seat post B) is lifted no more.

Referring to FIG. 9, by adjusting the length of said spring fixture element 4, the axial length resulting from the slide displacement of said lower floating piston 6 may be altered to adjust the height length of each adjustment of said seat post B. Said axial length is between the bottom end of said spring fixture element 4 and the top end of said lower floating piston 6.

Figure 10:
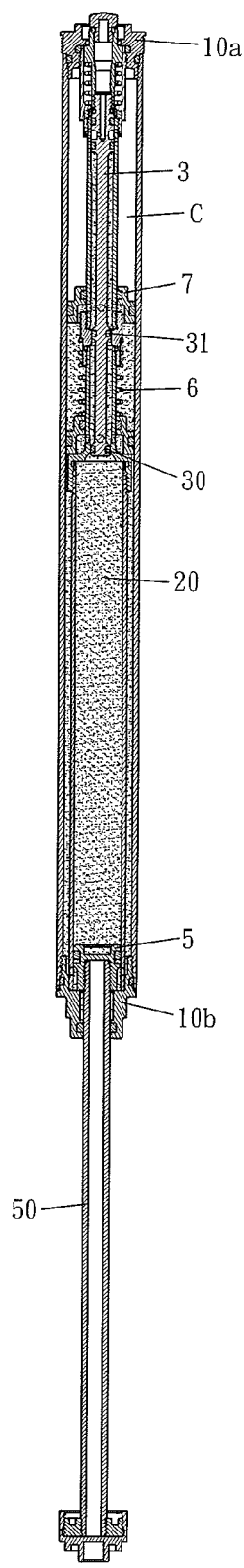
FIG. 10 is a structure diagram of the bicycle seat post height adjustment mechanism in the mode of stepped height adjustment of the seat post according to the preferred embodiment of the present invention.
Figure 11:
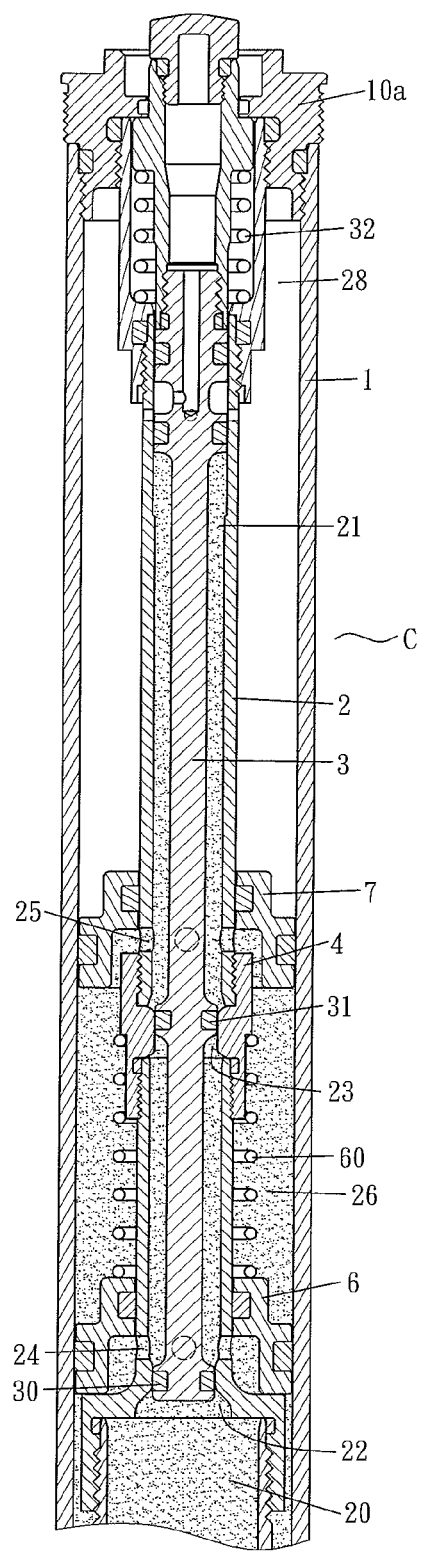
FIG. 11 is a partial enlarged view of FIG. 10.
Figure 12:
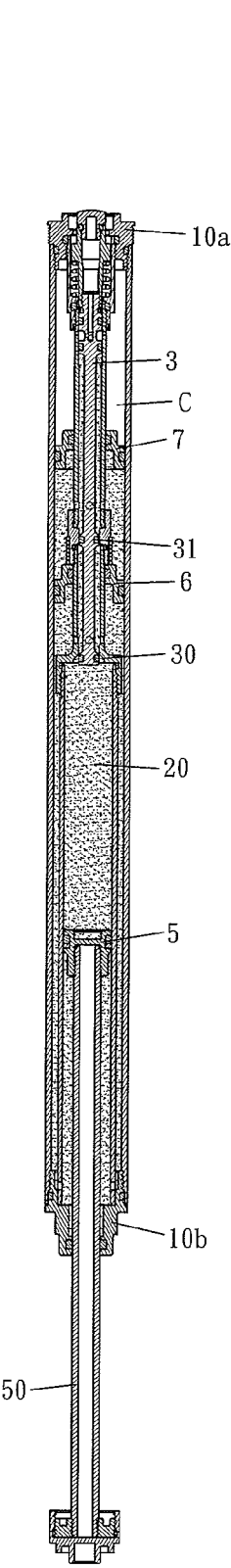
FIG. 12 is a structure diagram showing the seat post height adjusted to the middle position in the mode of stepped height adjustment of the seat post according to the preferred embodiment of the present invention.
Figure 13:
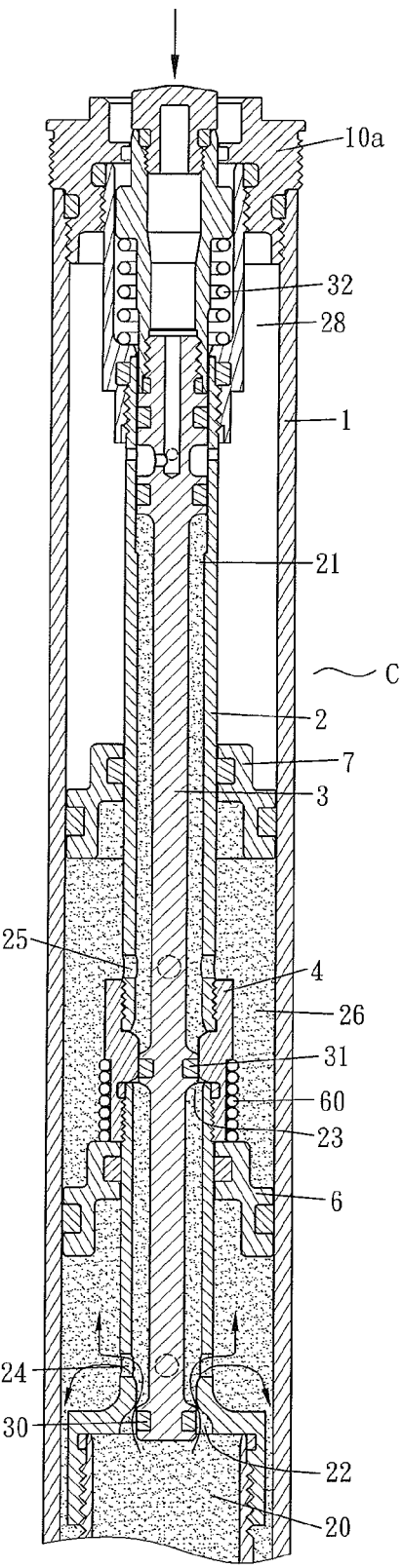
FIG. 13 is a partial enlarged view of FIG. 12.
Figures 14, 15:
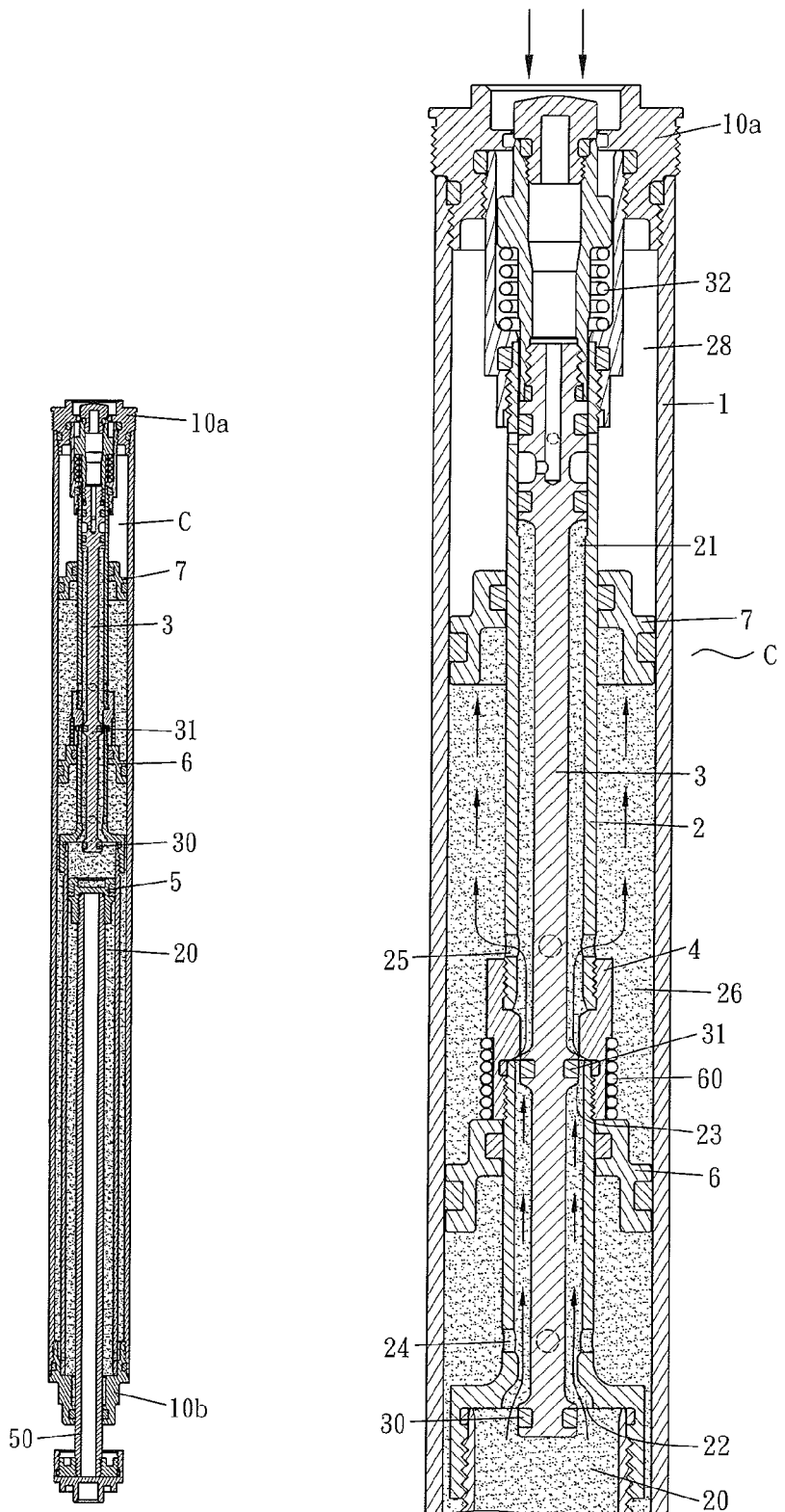
FIG. 14 is a structure diagram showing the seat post height adjusted to the lower position in the mode of stepped height adjustment of the seat post according to the preferred embodiment of the present invention.
FIG. 15 is a partial enlarged view of FIG. 14.

Referring to FIG. 10 and FIG. 11, an embodiment of the present invention provides a bicycle seat post height adjustment mechanism allowing said seat post B to make stepped height adjustment. The bicycle seat post height adjustment mechanism C disclosed in the embodiment of the present invention provides a three-stage seat post height adjustment mode including an upper position, a middle position and a lower position. The difference in structure between bicycle seat post height adjustment mechanisms A and C is as follows: When said pin is supported by said first spring 32 in a normal condition, said upper valve port 23 is blocked by said upper valve packing ring 31 and said lower valve port 22 is blocked by said lower valve packing ring 30. If said seat post B needs adjusting its height from the upper position to the middle position, as shown in FIG. 10 and FIG. 11, said pin 3 will be pushed down by said cam 33 to axially move down. Thus, said lower valve packing ring 30 will be away from said lower valve port 22 to open said lower valve port 22, yet said upper valve packing ring 31 will still block said upper valve port 23, as shown in FIG. 12 and FIG. 13. Moreover, when said seat post B is pushed down, the oil on top of said piston 5 inside said lower oil chamber 20 is squeezed into said upper oil chamber 21 via said lower valve port 22, and flows into the space under said lower floating piston 6 within said lateral oil chamber 26 through said middle through-hole 24. Then, the oil separates into two: one moves upwards to push said lower floating piston 6 to compress said second spring 60 to axially move upwards, until the top end of said lower floating piston 6 may touch the bottom end of said spring fixture element 4, and further, the other one returns to the space under said piston 5 within said lower oil chamber 20 through said lower through-hole 27. When said lower floating piston 6 moves up, said upper valve port 23 is closed. The oil volume between said lower floating piston 6 and said upper floating piston 7 is constant so that said upper floating piston 7 may move up simultaneously, as shown in FIG. 13. When released, said cam 33 may return to the home position thereof to revert to the blocking state that said upper valve packing ring 31 blocks said upper valve port 23 and said lower valve packing ring 30 blocks said lower valve port 22. Thus, said seat post B is allowed to be adjusted to the middle position to be fixed there. When said seat post B needs to be adjusted to the lower position, the length that said pin 3 is pushed to move down by said cam 33 is the largest, so that said lower valve packing ring 30 and said upper valve packing ring 31 are allowed to be respectively away from said lower valve port 22 and said upper valve port 23 to enable said lower valve port 22 and said upper valve port 23 to be opened simultaneously. Thus, said seat post B is allowed to be adjusted to the lower position if the user keeps pushing down said seat post B to move down, as shown in FIG. 14 and FIG. 15. In the condition shown in FIG. 15, said upper oil chamber 21, said lower oil chamber 20 and said lateral oil chamber 26 are intercommunicated with one another, and thus, the oil volume conversion may occur among said three chambers to allow said seat post B to be adjusted to the lower position. Being the same as the seat post B disclosed in the previous embodiment, said seat post B disclosed in this present embodiment incorporates the same function that said seat post B may self-return to the assigned position (an upper position, a middle position or a lower position) when a user releases the bicycle without holding said seat post B.

Figures 16, 17:
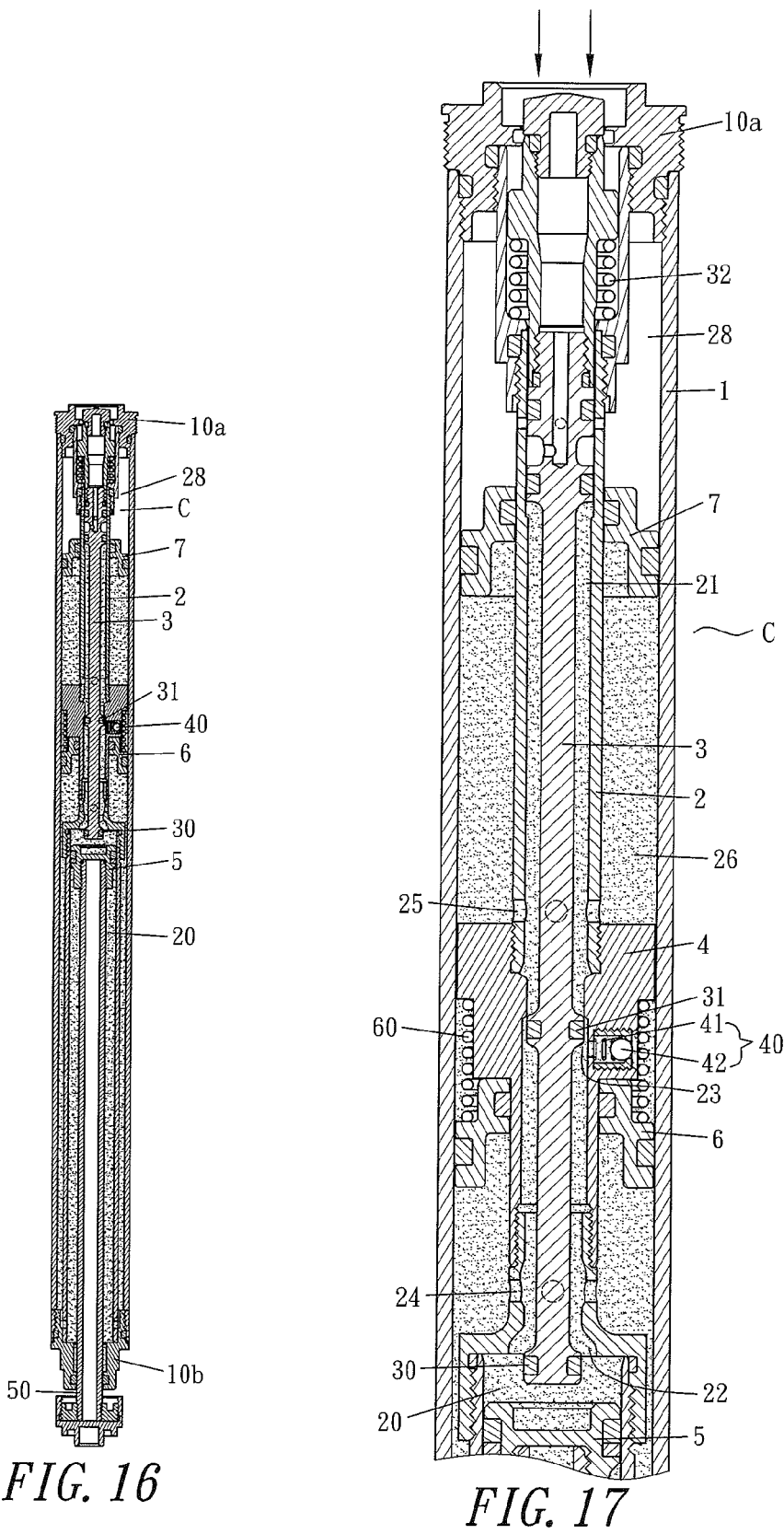
FIG. 16 is a structure diagram of the bicycle seat post height adjustment mechanism in the state that in the mode of stepped height adjustment of the seat post, the spring fixture element is arranged with a check valve according to the preferred embodiment of the present invention.
FIG. 17 is a partial enlarged view of FIG. 16.

Referring to FIG. 16, in the structure that said seat post B is allowed to make stepped height adjustment, the outer wall of said spring fixture element 4 under said upper valve port 23 is arranged with a radial check valve 40. When said lateral oil chamber 26 generates a large oil pressure force, the oil within said lateral oil chamber 26 may flow into said upper oil chamber 21 through said check valve 40. Contrarily, the oil within said upper oil chamber 21 is not allowed to flow through said check valve 40 into said lateral oil chamber 26. Said check valve 40, as shown in FIG. 17, has an interior provided with a third spring 41 and a ball valve 42. Said third spring 41 may push said ball valve 42 to move toward said lateral oil chamber 26 to block the port of said check valve 40.

Figures 18, 19, 20, 21:
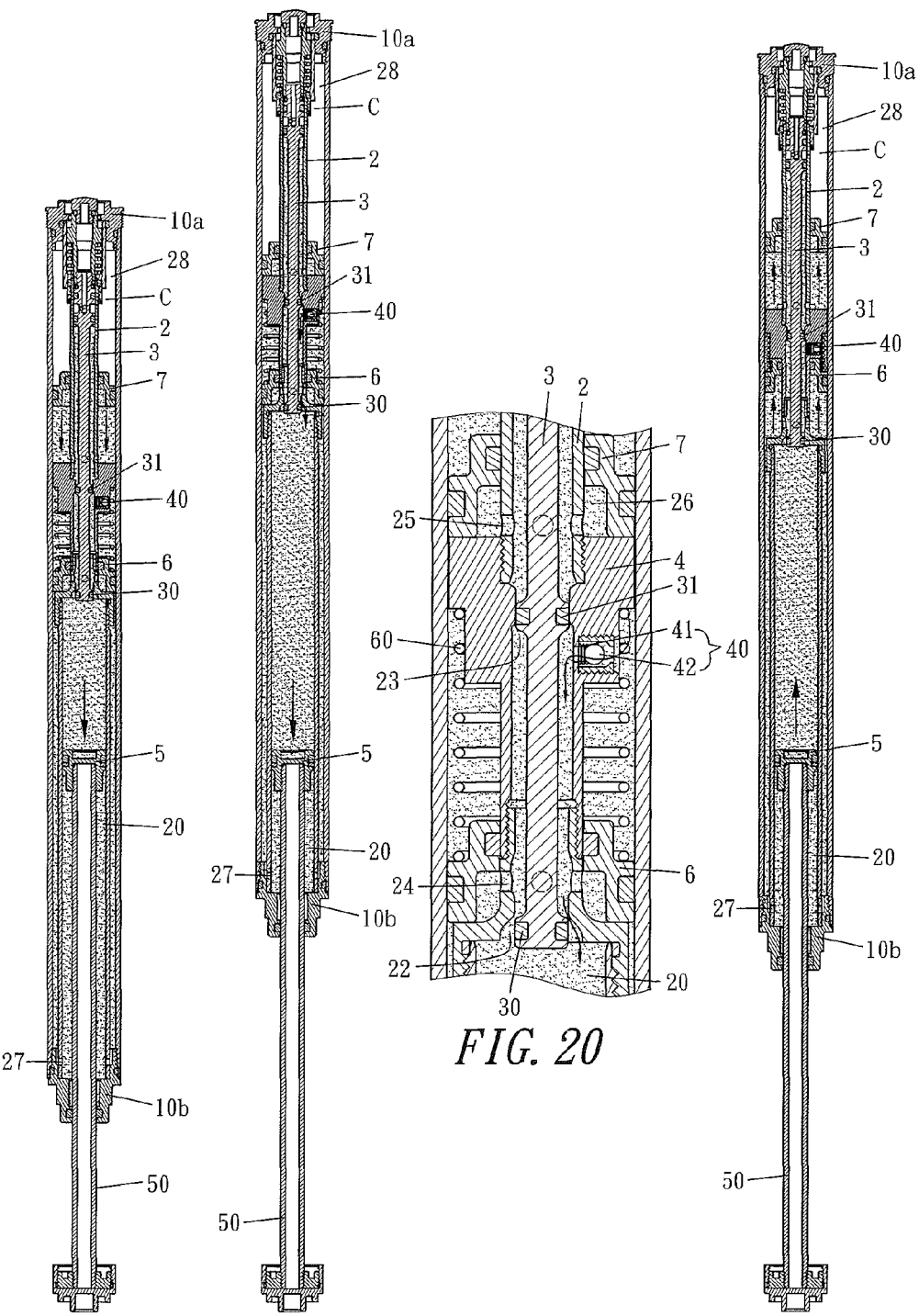
FIG. 18 and FIG. 19 are schematic drawings illustrating the movement of the lower floating piston and the upper floating piston as well as the flowing of the oil in the situation that the seat post is adjusted to the lowest position and the pin is pushed down according to the preferred embodiment of the present invention.
FIG. 20 is a partial enlarged view of the check valve shown in FIG. 19.
FIG. 21 is a schematic drawing of the state shown in FIG. 19 that illustrates the movement of the lower floating piston and the upper floating piston as well as the flowing of the oil when the seat post is pushed down according to the preferred embodiment of the present invention.

As shown in FIG. 16 and FIG. 17, said seat post B has been adjusted to the lowest position. If said seat post B (the seat) needs to be adjusted to a higher position, as shown in FIG. 18, under such operation, said pin 3 may be pushed downwards to axially move down. Thus, said lower valve packing ring 30 is allowed to be away from said lower valve port 22 to enable said lower valve port 22 to be opened, and said upper valve packing ring 31 is still in a state of blocking said upper valve port 23. During operating, said upper floating piston 7 may be pushed down by the high-pressure air within said air chamber 28 on top of said upper floating piston 7 to downwards squeeze the oil. Thus, said lower floating piston 6 is simultaneously pushed down by the oil pressure to allow the oil under said lower floating piston 6 to be squeezed into said lower oil chamber 20 via said middle through-hole 24 and said lower valve port 22. As said lower floating piston 6 is pushed to the terminal of the bottom by the oil pressure, the oil under said upper floating piston 7 may run towards said check valve 40 and pass through said check valve 40, said upper oil chamber 21 and said lower valve port 22, and then flow into said lower oil chamber 20 until said upper floating piston 7 is pushed to the terminal of the bottom by the high-pressure air within said air chamber 28, as shown in FIG. 19 and FIG. 20. After both said upper floating piston 7 and said lower floating piston 6 reach the lowest position, the rider on the bicycle seat may exert force downwards to allow said seat post B to move down to drive said piston 5 to move down and into said lower oil chamber 20. Thus, said seat (seat post B) may return to the second stage position (the middle position) from the lowest position, as shown in FIG. 21. Then, the position is allowed to be fixed by releasing said pin 3. Consequently, it is more efficient for said seat post B to return to the second stage position (the middle position) from the lowest position to allow said seat post B to be fixed to the assigned position more efficiently.

According to the mentioned above, the bicycle seat post height adjustment mechanism disclosed in the present invention allows fine adjustment, stepless adjustment or stepped adjustment on the basis of demands. Moreover, said seat post (seat) may self-return to the assigned position after a user releases the bicycle without holding the seat post or the seat thereof. Therefore, the present invention involves not only creative but also progressive development.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

Reference to positional descriptions, such as "upper", "lower", "top" and "bottom", are to be taken in context of the embodiment depicted in the figures, and are not to be taken as limiting the invention to the literal interpretation of the term but rather as would be understood by the skilled addressee.

What is claimed is:

1. A bicycle seat post height adjustment mechanism, which is fixed inside a seat post, comprising:
    an outer tube fastened to said seat post and having an upper opening and a lower opening respectively provided with a plug;
    an inner tube fixed to an interior of said outer tube, wherein the interior is partitioned into a lower oil chamber and an upper oil chamber; wherein said lower oil chamber and said upper oil chamber communicate with each other via a lower valve port, and wherein an upper valve port is arranged in a middle of an interior of said upper oil chamber;
    a pin inserted into said upper oil chamber of said inner tube;
    a lower valve packing ring corresponding to said lower valve port;
    an upper valve packing ring corresponding to said upper valve port;
    a first spring pushing said pin upwards to allow said lower valve packing ring to block said lower valve port in a normal mode; wherein said pin is pushed to compress said first spring to axially move to manage said upper and lower valve ports to open or close based on an other mode;
    a spring fixture element fixed to the outer wait of said inner tube and configured on top of said lower valve port;
    a piston arranged within said lower oil chamber and provided with a piston rod extending downwards through said lower oil chamber via said plug;
    a lower floating piston inserted between the inner tube and the outer tube and disposed under said spring fixture element and provided with a top end and a bottom end; wherein an axial length for movement of said lower floating piston is arranged between said top end of said lower floating piston and said spring fixture element; wherein the top end of said lower floating piston is connected with said spring fixture element by a second spring allowing said lower floating piston to be pushed downward; wherein a middle through-hole is arranged on top of said lower valve port within said inner tube with the bottom end of said lower floating piston communicating with said upper oil chamber through said middle through-hole;
    an upper floating piston inserted between the inner tube and the outer tube and disposed on top of said spring fixture element, wherein a bottom end of the upper floating piston communicates with said upper oil chamber through an upper through-hole arranged on top of said upper valve port of said inner tube;

a lateral oil chamber arranged between said inner tube and said outer tube, wherein said lateral oil chamber is positioned under said upper floating piston;

a lower through-hole arranged under said piston and also between said lateral oil chamber and said lower oil chamber to allow said lateral oil chamber and said lower oil chamber to communicate with each other via said lower through-hole; and an air chamber arranged between said inner tube and said outer tube, wherein said air chamber is on top of said upper floating piston.

2. The bicycle seat post height adjustment mechanism as claimed in claim 1, wherein said first spring pushes said pin up to allow said upper valve packing ring to block said upper valve port in the normal mode; and when said pin is pushed down to axially move downwards to allow said seat post to be adjusted downwards, said upper valve packing ring still blocks said upper valve port and said lower valve packing ring is away from said lower valve port in the other mode which is a mode of stepped height adjustment of the seat post to a next stage;

when said pin is pushed to axially move down by a length that is largest to allow said seat post to be adjusted downwards, said lower valve packing ring and said upper valve packing ring are allowed to be respectively away from said lower valve port and said upper valve port in the other mode which is a mode of stepped height adjustment of the seat post to a lowest position.

3. The bicycle seat post height adjustment mechanism as claimed in claim 2, wherein an outer wall of said spring fixture element under said upper valve port is arranged with a radial check valve which controls the oil within said lateral oil chamber to unidirectionally flow into said upper oil chamber.

4. The bicycle seat post height adjustment mechanism as claimed in claim 3, wherein said check valve is provided with a third spring and a ball valve; wherein said third spring pushes said ball valve to move toward said lateral oil chamber to block a port of said check valve.

5. The bicycle seat post height adjustment mechanism as claimed in claim 2, wherein in the mode of stepped height adjustment, by adjusting a length of said spring fixture element, the axial length resulting from the upward sliding of said lower floating piston is altered to adjust a height length of each adjustment of said seat post.

6. The bicycle seat post height adjustment mechanism as claimed in claim 1, wherein said first spring pushes said pin up to allow said upper valve packing ring to be away from and on top of said upper valve port in the normal mode;

when said pin is pushed down to axially move downwards, said lower valve packing ring is allowed to be away from said lower valve port and said upper valve packing ring blocks said upper valve port in the other mode which is a mode of fine height adjustment; and when said pin is pushed to axially move downwards, said lower valve packing ring and said upper valve packing ring are allowed to be respectively away from said lower valve port and said upper valve port in the other mode which is a mode of stepless height adjustment.

7. The bicycle seat post height adjustment mechanism as claimed in claim 6, wherein in the mode of fine height adjustment, by adjusting a length of said spring fixture element, the axial length resulting from the upward sliding of said lower floating piston is altered to adjust a height length of each adjustment of said seat post.

8. The bicycle seat post height adjustment mechanism as claimed in claim 1, wherein in the other mode, wherein the other mode is a mode of fine height adjustment or a mode of stepped height adjustment, by adjusting a length of said spring fixture element, the axial length resulting from the upward sliding of said lower floating piston is altered to adjust a height length of each adjustment of said seat post.

9. The bicycle seat post height adjustment mechanism as claimed in claim 1, wherein said pin is provided with a cam which is controlled to turn by a user to push down said pin to axially move downward.

* * * * *